(12) United States Patent
Hager et al.

(10) Patent No.: US 6,409,807 B1
(45) Date of Patent: Jun. 25, 2002

(54) LINEAR GAS VALVE CYCLE CONTROL, SHUT-OFF-VALVE AND SELF TEST

(75) Inventors: Charles Bradley Hager, Davenport, IA (US); Kevin Michael Dailey, Rock Island, IL (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 09/576,050

(22) Filed: May 23, 2000

(51) Int. Cl.[7] ............................................... B01D 53/04
(52) U.S. Cl. ............................ 96/111; 96/114; 96/130
(58) Field of Search ............................ 96/109, 111, 114, 96/115, 130

(56) References Cited

U.S. PATENT DOCUMENTS

| | | | | |
|---|---|---|---|---|
| 1,887,606 A | * | 11/1932 | Thomas ........................ 96/115 |
| 2,101,555 A | * | 12/1937 | Moore et al. .................. 96/115 |
| 3,659,399 A | * | 5/1972 | Kauer, Jr. et al. ......... 96/130 X |
| 3,894,561 A | | 7/1975 | Thornbery ............. 137/625.29 |
| 4,248,058 A | | 2/1981 | Bauer et al. ............... 62/324 A |
| 4,272,265 A | * | 6/1981 | Snyder ........................ 96/115 |
| 4,318,425 A | | 3/1982 | Marks ................... 137/625.43 |
| 4,404,005 A | * | 9/1983 | Hamlin et al. ................. 96/111 |
| 4,512,781 A | * | 4/1985 | Caralli et al. .................. 95/98 |
| 4,966,194 A | | 10/1990 | Nakatsukasa et al. .. 137/625.43 |
| 5,114,441 A | * | 5/1992 | Kanner et al. ................. 95/98 |
| 5,240,481 A | * | 8/1993 | Li et al. ....................... 96/109 |
| 5,340,381 A | * | 8/1994 | Vorih ....................... 95/105 X |
| 5,354,361 A | * | 10/1994 | Coffield .................... 96/109 X |
| 6,063,169 A | * | 5/2000 | Cramer et al. ............ 96/130 X |

* cited by examiner

*Primary Examiner*—Robert H. Spitzer
(74) *Attorney, Agent, or Firm*—Lowe Hauptman Gilman & Berner, LLP

(57) ABSTRACT

The present invention relates to detecting the state of a slide block positioned in a linear valve and using the position of the slide block to predict the health of a linear valve and provide information to a controller/monitor. An operator is provided with information before failure occurrence to allow preventative maintenance of the linear valve. The linear valve is constructed with two canister ports and a vent port. The slide block can be constructed to block the two canister ports and vent port simultaneously. The system can control the position of the block, when provided with position information, hence, using the slide block as a shutoff valve. The typical slide valve can be used as an integral slide shutoff valve, reducing system complexity and reducing system weight, which is critical to airborne applications.

23 Claims, 6 Drawing Sheets

LINEAR GAS VALVE CYCLE CONTROL, SHUT-OFF-VALVE AND SELF TEST

FIELD OF THE INVENTION

The present invention relates generally to gas valves, and more particularly, to a linear gas valve in which the position of a slide block housed therein can be detected.

BACKGROUND OF THE INVENTION

On Board Inert Gas Generating Systems (OBIGGS) or On Board Oxygen Generating Systems (OBOGS) utilize molecular sieve by employing a pressure swing adsorption (PSA) process that has been used for many years to generate either nitrogen or oxygen product sequentially, respectively. This process of sequential pressurization and venting is the PSA process. This PSA technology uses conditioned engine bleed air fed through the valve to pressurize molecular sieve contained in each of a number of canisters. After a predetermined period of time, a valve changes state, venting the one pressurized canister and then pressurizing the next canister. Previous PSA systems have been controlled by a rotary valve which is controlled by a valve and driven by a fixed or variable speed motor.

Recent PSA systems utilize a linear 4-way slide valve, which connects, input air with one canister, while connecting a vent port with another canister. The valve changes state, which connects the vent port with the first canister and simultaneously connecting the second canister with the input air.

The linear valve used on typical PSA systems is pneumatically operated using control pilot gas from miniature pilot solenoid valves and are opened and closed using solid state electronics which are housed in an EMI shielded enclosure. The pilot solenoids provide gas pressure to two gas cylinders, which are connected to a sliding block. The block slides across a mating plate with three openings or ports. The ports are constructed in a straight line. The outer ports are equal-distance from center port. The sliding block has an undercut, which acts as a flow path. The flow path is sized to connect two of the three ports at any one point in time. A controller is set to open and close the miniature pilot valves at a predetermined time or "cycle time".

The PSA device functions by forcing the undesired gas molecules into "sites" in the molecular sieve. The cycle time of the PSA process is largely determined by what purity is desired of the product gas. Using the linear valve, the slide block is controlled to provide the air to the desired canister and simultaneously vent the other canister. If the slide block slows down the resulting purity changes.

Airborne OBOGS systems usually have oxygen monitors to detect oxygen purity degradation and alarm the operator/pilot of a failure to produce desired oxygen. There are a number of internal and external conditions which result in poor oxygen. One internal condition which would cause poor purity would be a slide valve, which did not change state or changed state slower than desired. Airborne OBIGGS systems do not have nitrogen monitors. Some systems use an oxygen monitor and infer the nitrogen purity from the amount of residual oxygen in the product system. Nitrogen product purity is affected in the same manner as oxygen product purity if the slide valve fails to operate properly. External conditions which cause oxygen purity degradation include ambient temperature, below normal operating pressure, sieve degradation, moisture, etc.

The PSA process handles moisture entrained in the air during normal operation. If moisture enters the system through the air system, when the PSA process is not operating, the result is permanent damage to the molecular sieve. Damaged sieve does not separate air. Many OBOGS and OBIGGS systems have separate shut-off valves which prevent the entrance of air into the molecular sieve beds when the system is not operating. Thus, a need exists in the art for a linear valve having a slide block in which the current position of the slide block can be detected. Another need exists for a linear valve in which the separate shut-off valve is eliminated.

SUMMARY OF THE INVENTION

It is, therefore, an object of the present invention to provide a linear valve and control system in which the location of the slide block is monitored to trouble shoot performance problems before they occur.

Another object of the present invention is to provide a linear valve having a slide block in which the position is monitored by a sensing device.

Another object of the present invention is to provide a linear valve in which a shutoff valve is eliminated between the linear valve and an air source.

The present invention relates to detecting the state of a slide block positioned in a linear valve and using the position of the slide block to predict the health of a linear valve and provide information to a controller/monitor. An operator is provided with information before failure occurrence to allow preventative maintenance of the linear valve.

The linear valve is constructed with two canister ports and a vent port. The slide block can be constructed to block the two canister ports and vent port simultaneously. The system can control the position of the block, when provided with position information, hence, using the slide block as a shutoff valve. The typical slide valve can be used as an integral slide shutoff valve, reducing system complexity and reducing system weight, which is critical to airborne applications.

These and other objects of the present invention are achieved by a control system for controlling a gas generating system including at least two molecular sieve beds. A linear valve has a housing including an inlet connected to the gas generating system and a first port connected to a first of the at least two molecular sieve beds, a second port for exhaust, and a third port connected to a second of the at least two molecular sieve beds. The inlet, the first, second and third ports are all in communication with a slide chamber in the housing. A slide block is positioned in the slide chamber. A push-pull device is mounted to the housing for moving the slide block in a first direction and in a second direction. A sensor is positioned at opposite ends of the slide chamber for sensing the position of the slide block in the slide chamber. A controller is provided for receiving information from the sensing device and for controlling the push-pull device.

The foregoing and other objects of the present invention are also achieved by a linear valve including a housing. The housing includes an inlet connected to a gas generating system and a first port connected to a first of at least two molecular sieve beds, a second port for exhaust, and a third port connected to a second of the at least two molecular sieve beds, with the inlet, the first, second and third ports all in communication with a slide chamber in the housing with a slide block positioned in the slide chamber. A push-pull device is mounted to the housing for moving the slide block in a first direction and in a second direction. A sensor is positioned at opposite ends of the slide chamber for sensing the position of the slide block in the slide chamber.

The foregoing and other objects of the present invention are also achieved by a method of monitoring an operational status of a linear valve including detecting when a linear slide block is in one of at least two positions, determining at least one of slew rate, full length stroke and uneven stroke and alerting a user if one of the slew rate, full length stroke and uneven stroke exceeds a predetermined value.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
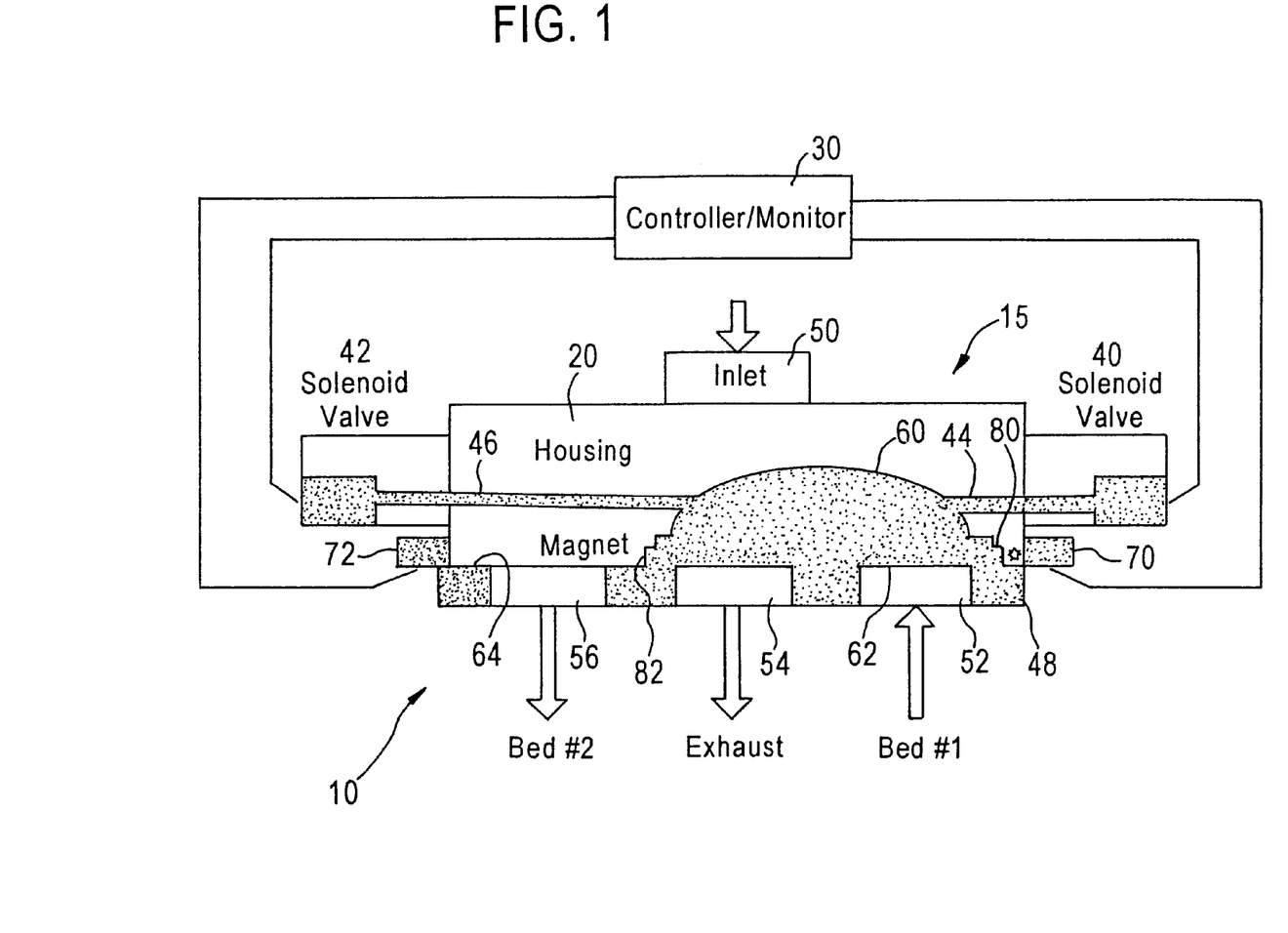
FIG. 1 is a schematic illustration of a linear valve including a slide block and a sensing device for sensing the current location of the slide block in the valve housing.

Referring to FIG. 1, a linear slide valve system, generally indicated at 10, includes a linear slide valve assembly 15 and a controller/monitor 30 according to the present invention. Linear valve assembly 15 includes a pair of solenoid valves 40, 42 mounted on opposite ends of a housing 20. The housing 20 includes an inlet 50 on one side of the housing 20, a first port 52, second port 54 and a third port 56, all on an opposite side of the housing 20. The ports 52, 54, 56 are provided in the base plate 48. Ports 52 and 56 are equally spaced from the central port 54. A slide block 60 includes a flat surface 62 sliding on an upper surface 64 of the plate 48. In the embodiment depicted in FIG. 1, the inlet 50 is spaced from the slide block 60 and the slide block 60 is of sufficient length to cover either ports 52, 54 or ports 54, 56. The solenoids 40, 42 are 3-way solenoids of the type known in the art and are utilized in a preferred embodiment of the invention. Other control means, solenoid, air or otherwise can be used without departing from the spirit and scope of the invention.

The slide block 60 is driven in a first direction by solenoid valve 40 and in an opposite direction or second direction by solenoid valve 42. Rods 44 and 46 are attached to solenoid valves 40, 42 and to the sliding block to move the sliding block in opposite directions. Proximity switches 70, 72 are mounted on opposite ends of housing 20. On opposite sides of slide block 60 are mounted a pair of magnets 80, 82 which when brought into proximity with switches 70, 72, respectively, a signal is sent to the controller/monitor 30 as will be described in greater detail below. As depicted in FIG. 1, the slide block 60 is shown in a first position blocking ports 52 and 54. In this manner, inlet 50 is in communication with port 56 to bed # 2. In this first position, bed #1 can exhaust through the port 52 through the slide block 60 into the exhaust port 54 while air is provided from the inlet 50 through the port 56 to bed #2.

Figure 2:
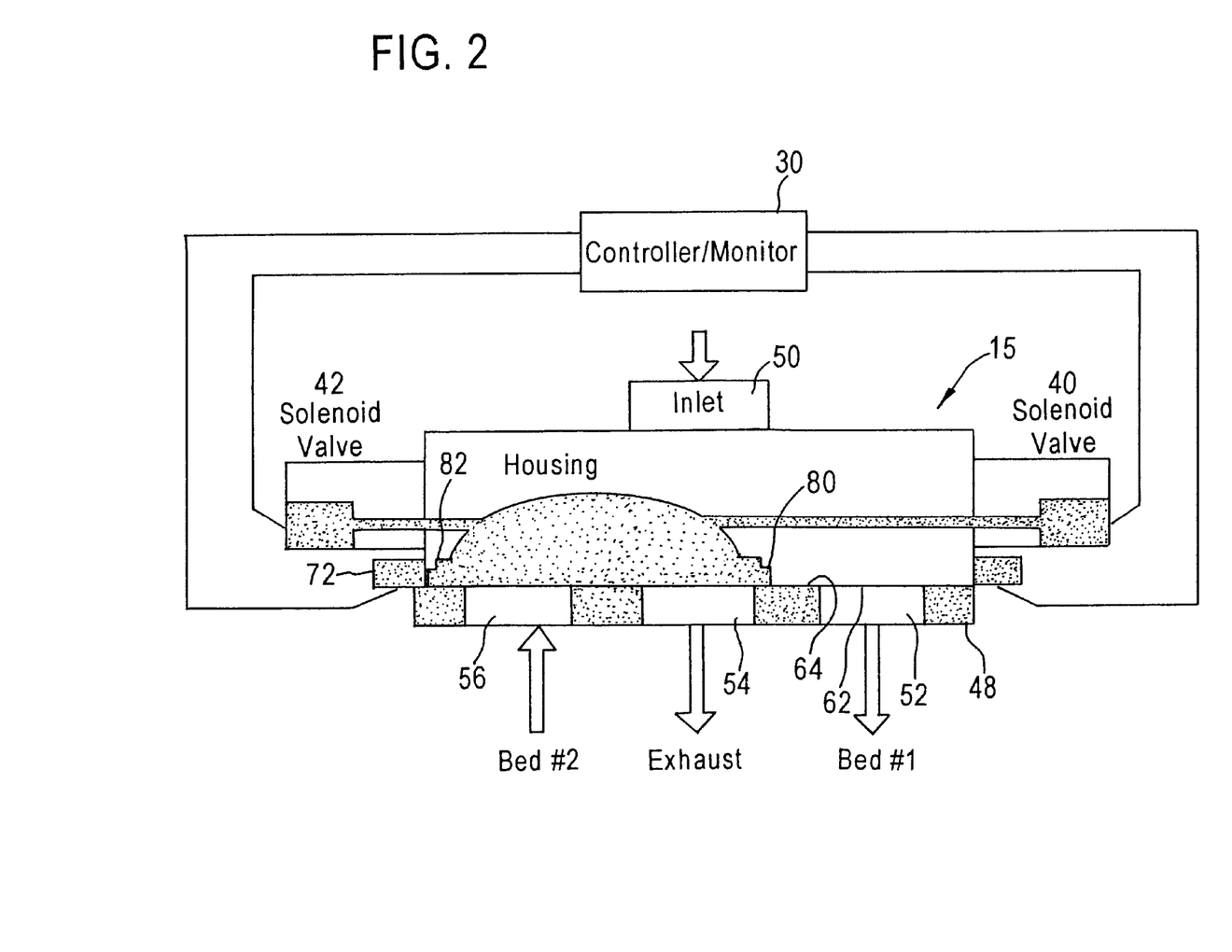
FIG. 2 is a drawing similar to FIG. 1 with the slide block shown in a second position.

FIG. 2 is similar to FIG. 1 except that the slide block is depicted in a second position. In this second position, bed #2 can exhaust through the port 56 and through the slide block 60 into the exhaust port 54 while air is provided from the inlet 50 through the port 52 to bed #1. Generally a spring (not shown) is used between the piston and the slide block 60. Closed cell foam has also been used. The valve located in FIG. 2 does not have a spring or foam. Instead the valve has tight tolerances with the assembly to maintain position of the slide valve. The valve will become seal tight under operating pressures.

Figure 3:
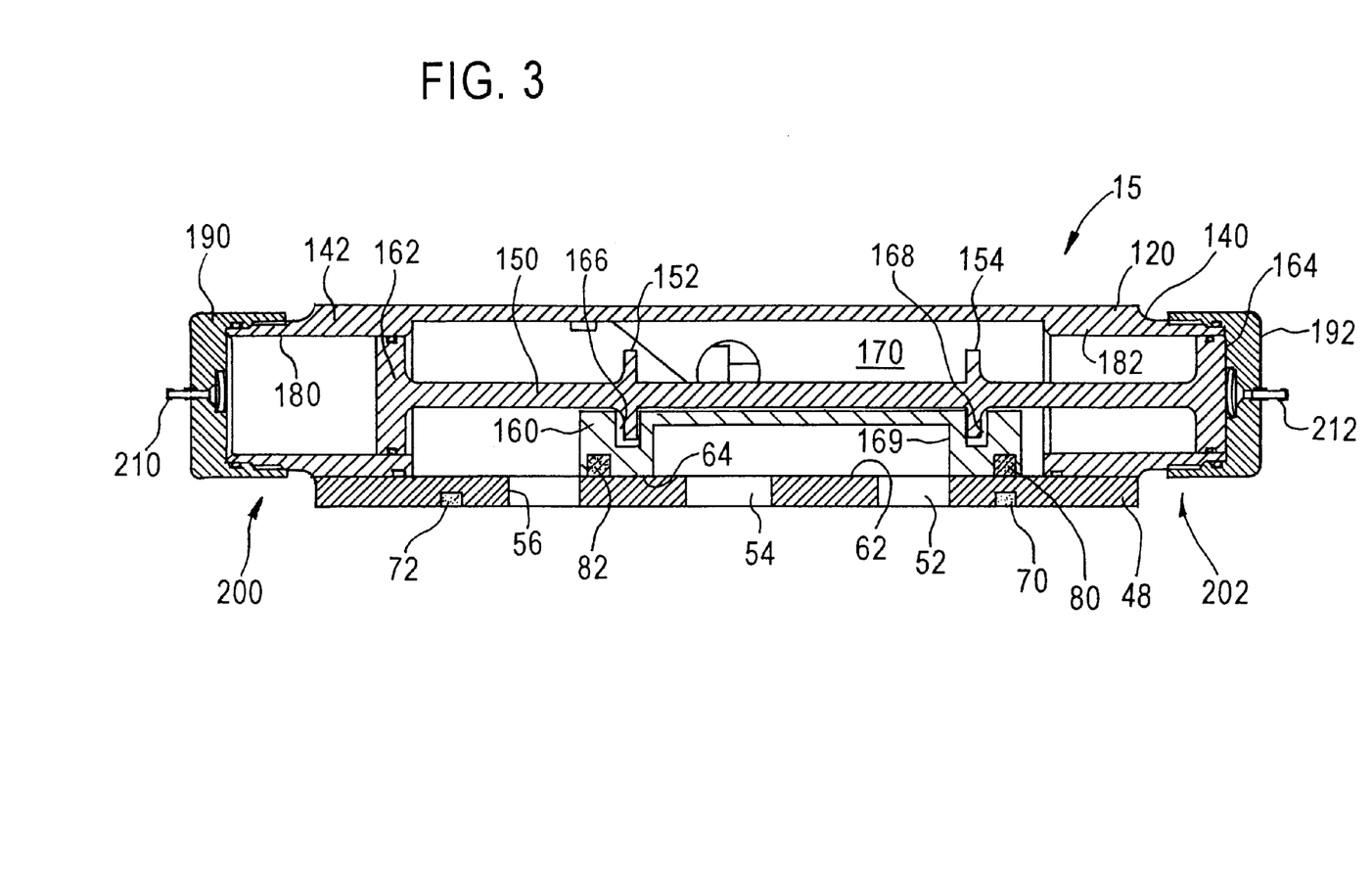
FIG. 3 is an alternative embodiment similar to FIGS. 1 and 2 using air cylinders to drive the slide block.

FIG. 3 is similar to the embodiment depicted in FIGS. 1 and 2 except that instead of solenoid valves 40, 42, a pair of air cylinders 140, 142 are used to move a driving member 150 in a first and second direction. The driving member 150 is an elongated cylindrically shaped member having two intermediate shoulder members 152, 154 and two piston heads 162, 164. The two intermediate shoulders 152, 154 are partially positioned in slots 166, 168, respectively for engagement with a sliding block 160. The sliding block 160 includes magnets 80, 82 mounted in the lower surface 64. A pair of sensors 70, 72 are mounted in the plate 48 at opposite ends of a slide block chamber 170. Formed between the piston heads 162, 164 and plate 48 is the slide block chamber 170. An inlet (not shown) is centered in the housing just above the exhaust port. At opposite ends of housing 120 are opposite cylindrical bores 180, 182, in which piston heads 162, 164 slide in a reciprocal fashion, respectively. Threaded on opposite surfaces of housing 120 are threads and onto each of the threads are caps 190, 192 to seal off and form a first cylinder 200 and a second cylinder 202 in which piston heads 162, 164 slide respectively. Poppets 210, 212 are located in threaded members 190, 192. The driving member 150 is moved in opposite directions as follows. As depicted in FIG. 3, poppet 210 would be opened and the cylinder 200 pressurized while poppet 212 would also be opened allowing the cylinder to be vented thereby moving the driving member to the right with the cylinder 202 being vented. FIG. 3 also best depicts an undercut 169 through the slide block 160 which permits flow between ports 52, 54 while sealing these ports from the slide chamber 170.

Although proximity sensors and magnetic sensors have been described, it should be understood that other sensors could be used in the present invention in any of the embodiments described herein. Optical sensors have become very popular recently with infra red and laser. These devices can be very precise. These devices can detect the range of travel as well as the limits of travel. The exact location of the sliding block 60, 160 could be known at all times.

Pressure transducers are commonly used in testing for such information as cycle rates and slide valve operation by monitoring the cylinder pressure. In conjunction with a strip chart, the operating pressure can be determined pretty accurately. This device can be used to determine the approximate location of the slide block (will not locate precisely).

Contacts could be placed on the end of the sliding block 60, 160 and in the housing at the end of its travel. This would indicate whether the block was completing its stroke and the time it takes to get there. This device would be the simplest to incorporate and would be very accurate in time of piston travel and piston location and is considered the presently preferred embodiment.

Figure 4:
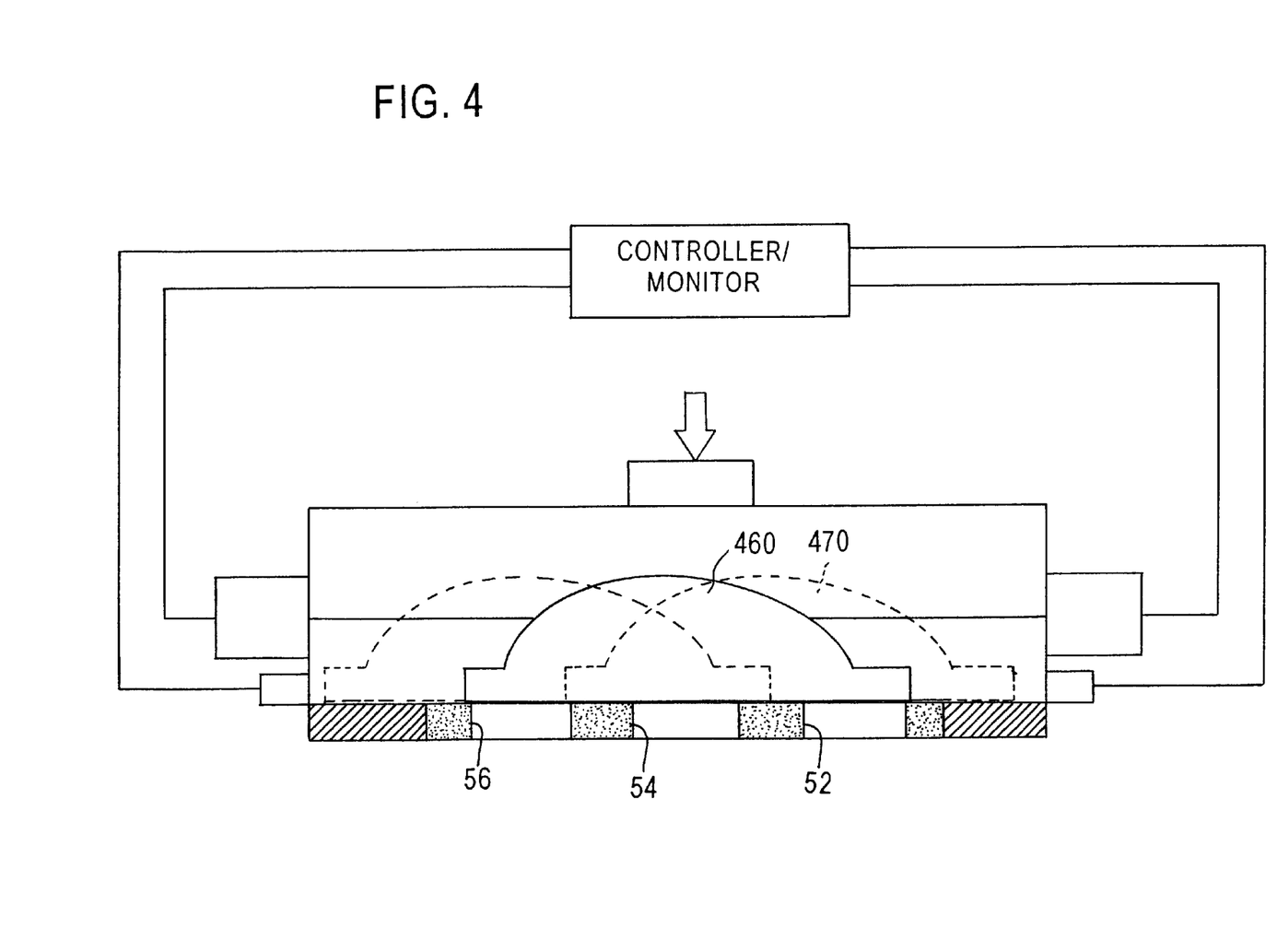
FIG. 4 is another embodiment in which the linear valve housing is made large enough that the slide block can be moved to a position in which all three ports are blocked.
Figure 6:
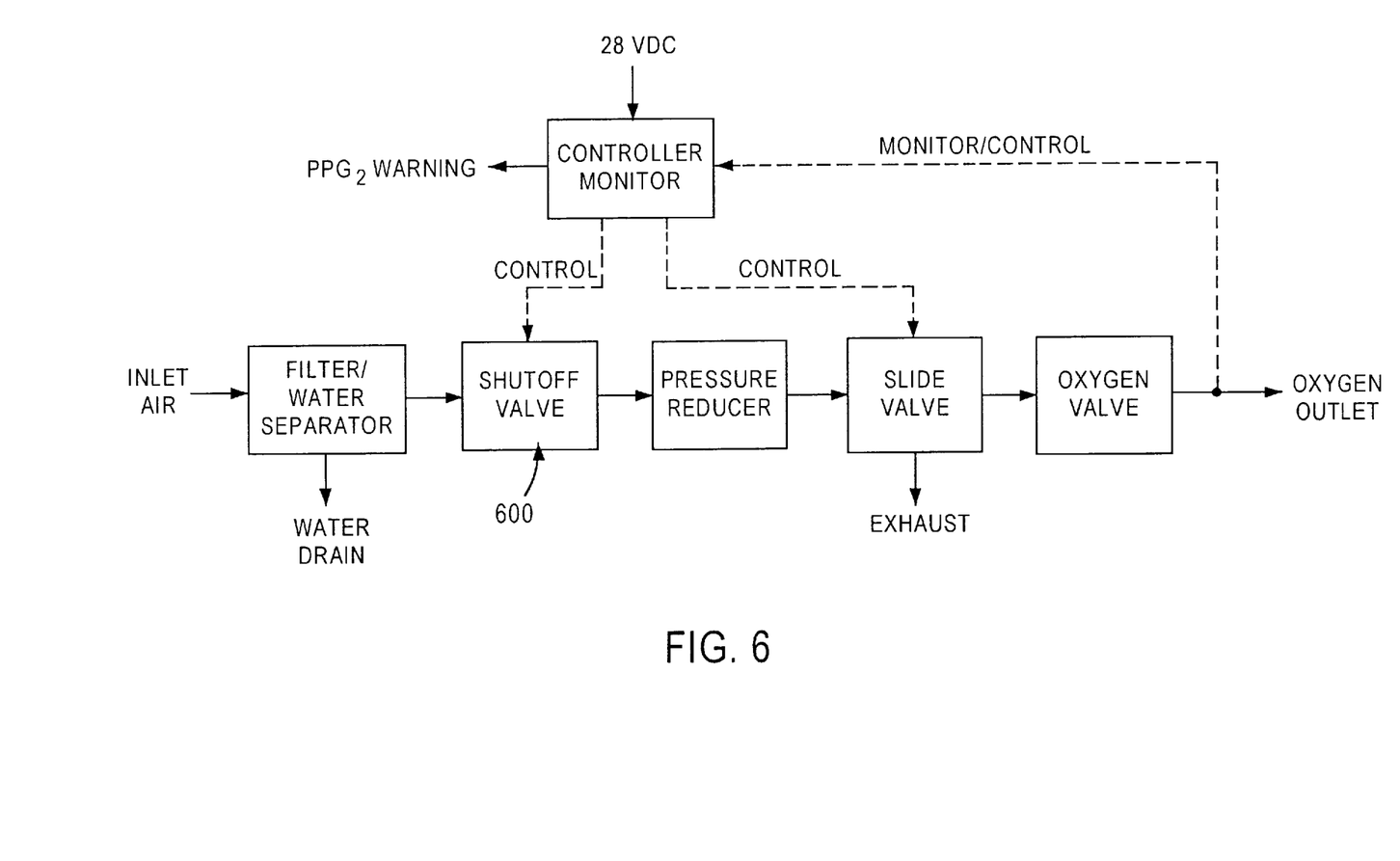
FIG. 6 is a top level block diagram of a pneumatic circuit.

The slide valve depicted in FIG. 4 is similar to the linear slide valves depicted in FIGS. 1–3 except that the slide chamber 470 has greater length to enable a slide block 460 to be able to simultaneously cover ports 52, 54, 56. The sensors are located in the same position as those in FIG. 1 with the possible addition of another located centered on the slides of the slide block. This would enable the detection of the slide block in the shut off position. Advantageously, in this embodiment, the shut-off valve 600 (FIG. 6) can be eliminated. In the slide chamber 470 depicted in FIG. 4, there is greater spacing between the ports 52 and 56 and ends of the slide chamber to allow the slide block 460 to move to the first and second positions depicted in dashed lines in FIG. 4.

Figure 5:
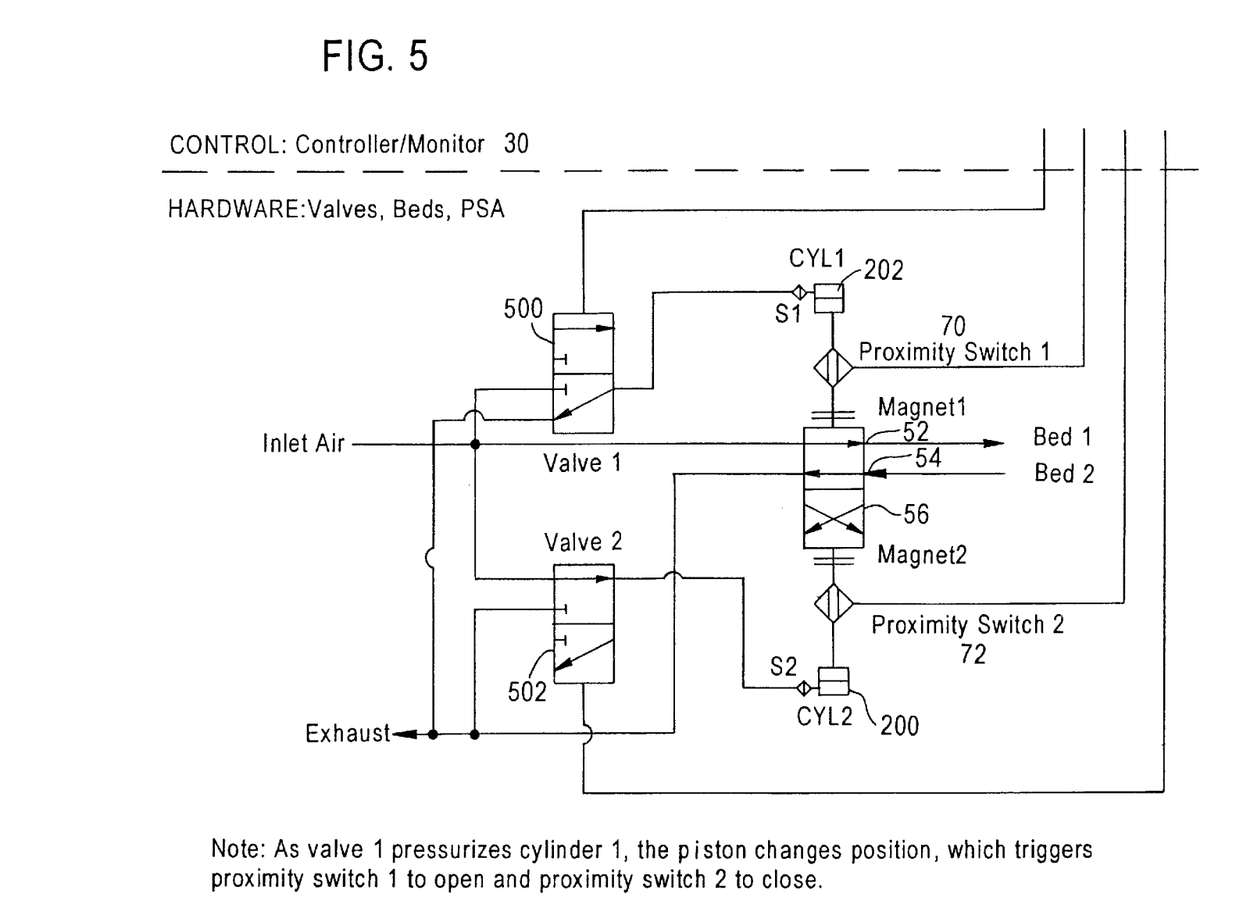
FIG. 5 is a pneumatic circuit diagram illustrating the pneumatic circuit used in the embodiment depicted in FIG. 3.

FIG. 5 depicts a schematic for operating the linear slide valve depicted in FIG. 3. In FIG. 5, the proximity switches 70, 72 are depicted as connected to the controller/monitor 30. Three way valves 500, 502 are also each connected to the controller/monitor 30 and are pneumatically connected to the air cylinders 200, 202. As valve 500 is in a first position inlet air is introduced into the cylinder 202, thereby forcing the piston 164 to change position which triggers the proximity switch 70 to open and the proximity switch 72 to close. One way of monitoring the health of the slide valve 15 might be as follows: The controller/monitor commands the slide valve 15 to switch to the opposite of its two positions. As soon as the proximity switch 70, 72 (sensing the current position) senses that the slide block 60 has begun to move from the first position, a timer in the controller/monitor 30 is started. When the controller/monitor 30 receives the signal from the sensor 70, 72 that the slide block 60 has reached the opposite position, the timer is stopped. The length of time elapsed is a measure of the transition time for the valve 15. The controller/monitor 30 can detect conditions that have effects on the travel time of the valve 15 such as input air pressure and temperature. Comparing this time to an acceptable time (for the known input pressure and temperature conditions) provides a measure of the performance of the valve. A simple display can show instantaneous cycle rate, which could be monitored or a signal would light when cycles rate become out of tolerance. In the case of using the slide block 60 as a shut off valve, the controller/monitor 30 would be used to control the position of the slide block 60 from the location information supplied by the sensors 70, 72. It should now be understood that a linear valve and control system has been described in which the location of the slide block is monitored to troubleshoot performance before they occur. It should also be apparent that a linear valve has been described which eliminates the shut-off valve.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A control system for controlling a gas generating system including at least two molecular sieve beds, comprising:

a linear valve having a housing including an inlet connected to the gas generating system and a first port connected to a first of the at least two molecular sieve beds, a second port for exhaust, and a third port connected to a second of the at least two molecular sieve beds, with said inlet, said first, second and third ports all in communication with a slide chamber having a slide block positioned in said slide chamber;

a push-pull device is mounted to said housing for moving said slide block in a first direction and in a second direction;

a sensor positioned at opposite ends of said slide chamber for sensing the position of said slide block in said slide chamber; and a controller for receiving information from said sensor and for controlling said push-pull device.

2. The system of claim 1, wherein said sensor is one of an optical sensor, a pressure transducer, a magnetic switch and a contact switch.

3. The system of claim 1, wherein said sensor is a magnetic switch and wherein a plurality of magnets mounted to said slide block and a corresponding plurality of proximity switches mounted to said housing.

4. The system of claim 1, wherein said slide block has a first position in which said slide block covers said first port and said second port such that the gas generating system can provide product gas through said inlet and said third port to the second of the molecular sieve beds and the first molecular sieve bed can be vented through said first port to said second port and a second position in which said slide block covers said third port and said second port such that the gas generating system can provide product gas through said inlet and said first port to the first of the molecular sieve beds and the second molecular sieve bed can be vented through said third port to said second port.

5. The system of claim 4, wherein said slide block includes a flow path.

6. The system of claim 4, wherein said slide block has a third position covering said first port, said second port and said third port.

7. The system of claim 1, wherein the gas generating system is an oxygen concentrator.

8. The system of claim 7, wherein said oxygen concentrator uses pressure swing adsorption.

9. The system of claim 1, wherein said controller monitors the current location of said slide block during operation and determines slew rate, full-length stroke and uneven stroke.

10. The system of claim 1, wherein said push-pull device is one of a pair of air cylinders and a pair of solenoid valves.

11. The system of claim 1, further comprising an oxygen monitor for monitoring the quality of gas provided to said first port and said second port by the gas generating system.

12. A linear valve, comprising:

a housing including an inlet connected to a gas generating system and a first port connected to a first of at least two molecular sieve beds, a second port for exhaust, and a third port connected to a second of the at least two molecular sieve beds, with said inlet, said first, second and third ports all in communication with a slide chamber in the housing with a slide block positioned in said slide chamber;

a push-pull device is mounted to said housing for moving said slide block in a first direction and in a second direction; and a sensor positioned at opposite ends of said slide chamber for sensing the position of said slide block in said slide chamber.

13. The linear valve of claim 12, wherein said sensor is one of an optical sensor, a pressure transducer, a magnetic switch and a contact switch.

14. The linear valve of claim 12, wherein said senor is a magnetic switch and wherein a plurality of magnets mounted to said block and a corresponding plurality of proximity switches mounted to said housing.

15. The linear valve of claim 12, wherein said slide block has a first position in which said slide block covers said first port and said second port such that the gas generating system can provide product gas through said inlet and said third port to the second of the molecular sieve beds and the first molecular sieve bed can be vented through said first port to said second port and a second position in which said slide block covers said third port and said second port such that the gas generating system can provide product gas through said inlet and said first port to the first of the molecular sieve beds and the second molecular sieve bed can be vented through said third port to said second port.

16. The linear valve of claim 12, wherein said slide block includes a flow path.

17. The linear valve of claim 12, wherein the gas generating system is an oxygen concentrator.

18. The linear valve of claim 12, further comprising a controller which monitors the current location of said slide block during operation and determines slew rate, full length stroke and uneven stroke.

19. The linear valve of claim 12, wherein said push-pull device is one of a pair of air cylinders and a pair of solenoid valves.

20. The linear valve of claim 12, wherein said gas generating system is an oxygen concentrator which uses pressure swing adsorption.

21. The linear valve of claim 12, wherein said slide block has a third position covering said first port, said second port and said third port.

22. The linear valve of claim 12, further comprising an oxygen monitor for monitoring the quality of gas provided to said first port and said second port by the gas generating system.

23. A method of monitoring an operational status of a linear valve, comprising:

detecting when a linear slide block is in one of at least two positions;

determining at least one of slew rate, full length stroke and uneven stroke; and alerting a user if one of the slew rate, full length stroke and uneven stroke exceeds a predetermined value.

* * * * *